(12) United States Patent
Uhkötter et al.

(10) Patent No.: US 12,031,622 B2
(45) Date of Patent: Jul. 9, 2024

(54) PLANETARY GEARBOX FOR A GAS TURBINE ENGINE, AND GAS TURBINE ENGINE

(71) Applicant: Rolls-Royce Deutschland Ltd & Co KG, Blankenfelde-Mahlow (DE)

(72) Inventors: Stephan Uhkötter, Berlin (DE); Rens Douma, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/068,332

(22) Filed: Dec. 19, 2022

(65) Prior Publication Data
US 2023/0193991 A1  Jun. 22, 2023

(30) Foreign Application Priority Data
Dec. 21, 2021 (DE) .................... 10 2021 134 169.8

(51) Int. Cl.
*F16H 57/04* (2010.01)
*F02C 7/06* (2006.01)
*F02C 7/36* (2006.01)
*F16H 57/08* (2006.01)

(52) U.S. Cl.
CPC ........... *F16H 57/0479* (2013.01); *F02C 7/06* (2013.01); *F02C 7/36* (2013.01); *F16H 57/043* (2013.01); *F05D 2260/40311* (2013.01); *F05D 2260/98* (2013.01); *F16H 2057/085* (2013.01)

(58) Field of Classification Search
CPC ........... F16H 57/0479; F02C 7/06; F02C 7/36
See application file for complete search history.

(56) References Cited

U.S. PATENT DOCUMENTS

| | | | | |
|---|---|---|---|---|
| 8,591,371 | B2 * | 11/2013 | Dinter | F16C 33/1055 |
| | | | | 475/160 |
| 10,962,058 | B2 * | 3/2021 | Tsurumi | F16C 33/6677 |
| 11,661,892 | B2 * | 5/2023 | Uhkötter | F02K 3/06 |
| | | | | 475/159 |

(Continued)

FOREIGN PATENT DOCUMENTS

DE    102020122584 A1    3/2022

OTHER PUBLICATIONS

German Search Report dated Aug. 18, 2022 from counterpart German Patent Application No. 102021134169.8.

*Primary Examiner* — Derek D Knight
(74) *Attorney, Agent, or Firm* — SHUTTLEWORTH & INGERSOLL, PLC; Timothy J. Klima

(57) ABSTRACT

A planetary gearbox for a gas turbine engine has a planet gear rotatably mounted on a carrier element, which is connected in a rotationally fixed manner to a planet carrier. An oil feed pocket is in a region of an external side of the carrier element, via which oil is passed into a bearing gap between the carrier element and the planet gear. The carrier element has a duct carrying oil. The duct in is provided radially within an external side of the carrier element, having a cross section which is closed in relation to the bearing gap. The duct in the flow direction of the oil has at least two sequential duct portions. The flow cross section of the duct in a transition region between an upstream duct portion and a next downstream duct portion decreases in an at least approximately step-shaped manner.

27 Claims, 8 Drawing Sheets

(56) References Cited

U.S. PATENT DOCUMENTS

2013/0035190 A1* 2/2013 McCune ................. F16C 33/02
464/7
2016/0326902 A1* 11/2016 McCune ................... F02C 9/18
2018/0216489 A1 8/2018 Curlier et al.

* cited by examiner

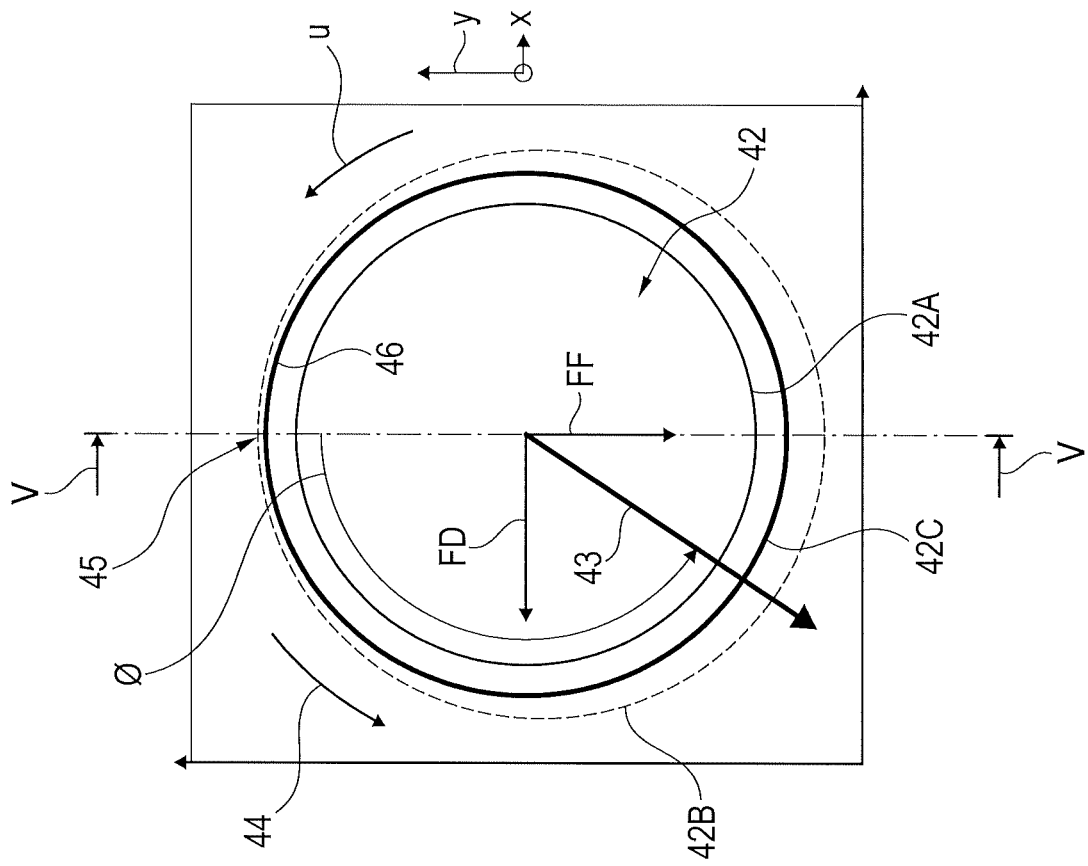
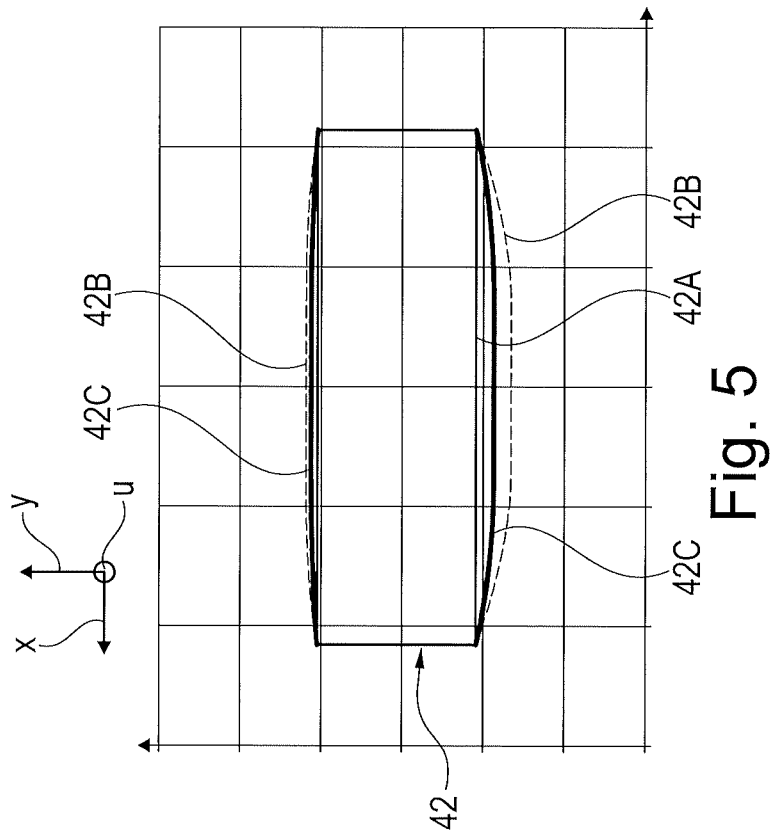
Fig. 4
Fig. 5

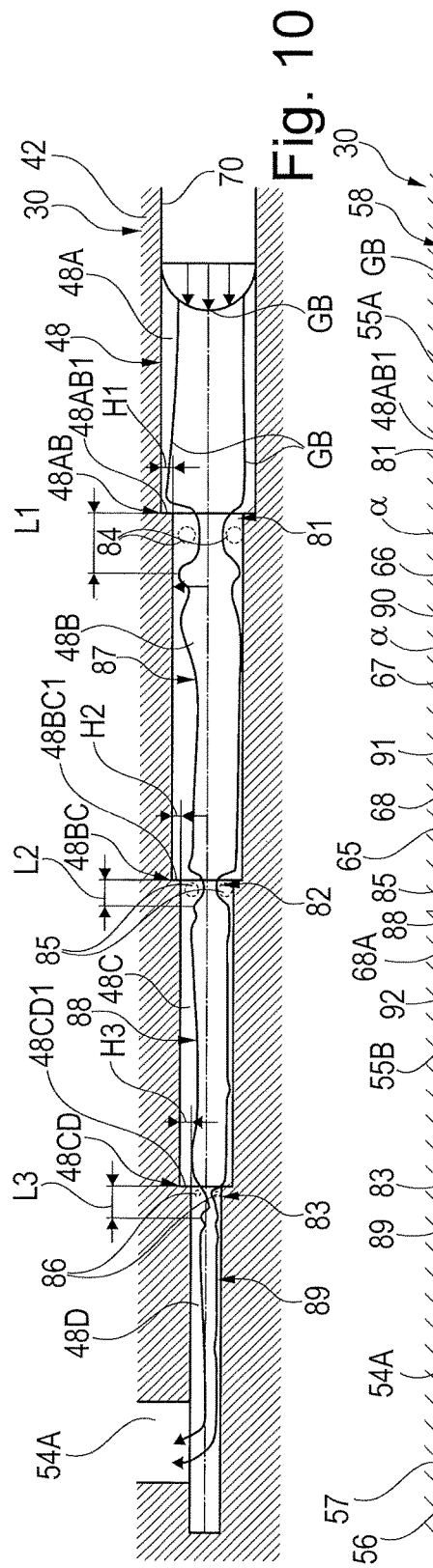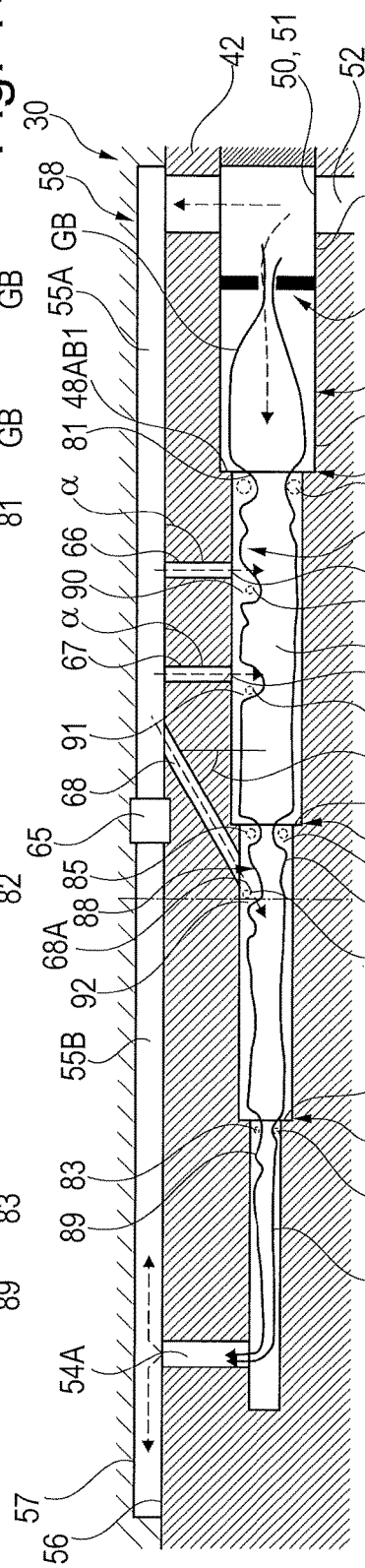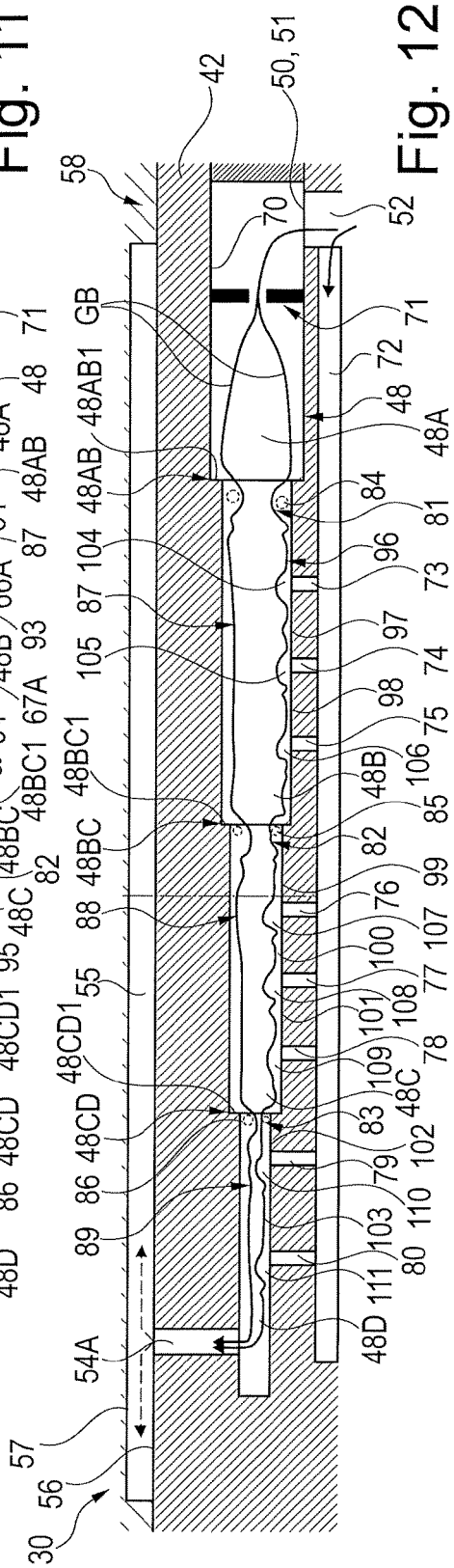

PLANETARY GEARBOX FOR A GAS TURBINE ENGINE, AND GAS TURBINE ENGINE

This application claims priority to German Patent Application 10 2021 134 169.8 filed Dec. 21, 2021, the entirety of which is incorporated by reference herein.

The present disclosure relates to a planetary gearbox for a gas turbine engine, having a planet carrier and having at least one planet gear, which is mounted rotatably on a carrier element by means of a plain bearing. In addition, the disclosure relates to a gas turbine engine having such a planetary gearbox.

Aside from rolling bearings, plain bearings are the most frequently used type of bearing in the construction of machinery and equipment. Here, the two parts that move relative to one another in the plain bearing are in direct contact. Said two parts slide on one another counter to the resistance caused by dynamic friction. The latter can be kept low by selecting a low-friction material pairing, by lubricating or by generating a lubricating film that separates the two contact surfaces from one another. If the two parts come into contact, which is the case in most plain bearings that are used, wear occurs on the contact surfaces, limiting the service life of a plain bearing. In the case of full lubrication, the generation of the separating lubricating film requires additional outlay. The sliding resistance has the effect that a proportion of the kinetic energy is converted into thermal energy, which flows into the two bearing parts and may have to be dissipated.

Plain bearings are differentiated inter alia according to sliding resistance. In this context, a distinction is drawn between simple plain bearings, hydrodynamic plain bearings and hydrostatic plain bearings. Simple plain bearings are either non-lubricated, or lubricated by means of a lubricant, such as grease. Depending on the design of a plain bearing, the sliding resistance results from what is known as solid body friction, mixed friction or fluid friction.

In the case of plain bearings with solid body friction, which is often also referred to as dry friction, low-friction pairings of materials are used. Sometimes, one of the two partners has what is known as a self-lubricating property. The second partner is generally produced from steel.

In turbines and generators, use is often made of plain bearings, the sliding resistance therebetween resulting from fluid friction. The desired lubricating film in the bearing gap must be pressurized in order that it can separate the contact surfaces from one another counter to the bearing force. In the case of hydrostatic plain bearings, an oil pump is used for this purpose. By contrast, in the case of so-called hydrodynamic plain bearings, the oil pressure in the lubricating film is produced by the contact surfaces themselves as they move relative to one another.

In the case of gearboxes which are used in gas turbine engines of aircraft, there are special requirements set for plain bearings owing to the limited amount of oil available and the, in some cases, high operating temperatures. In addition, a total weight of a gas turbine engine should be as low as possible. However, this requirement demands that a stiffness of the design is characterized by a lower stiffness in comparison with conventional applications, such as stationary industrial applications.

Owing to the high loads in the region of plain bearings of gearboxes of gas turbine engines, unwanted thermal deformations can occur in the region of a plain bearing, said thermal deformations having a negative effect on functionality and operating safety. Moreover, only a small part of the oil flow supplied reaches the highly loaded region of a plain bearing, where the highest temperatures occur. The effect is that, in the more highly loaded regions of such plain bearings, high local temperatures occur, and these may also be critical for the coating in the region of the bearing surfaces.

It is the underlying object of the present disclosure to make available a planetary gearbox for a gas turbine engine, as well as a gas turbine engine which has a planetary gearbox of this kind, each being distinguished by a long service life.

This object is achieved by a planetary gearbox and by a gas turbine engine having features as disclosed herein. Advantageous refinements form the subject matter of the dependent claims and of the following description.

A planetary gearbox for a gas turbine engine, having a planet carrier and at least one planet gear, is proposed. The planet gear by means of a plain bearing is rotatably mounted on a carrier element which is connected in a rotationally fixed manner to the planet carrier. At least one oil feed pocket is provided in the region of an external side of the carrier element, by way of which feed pocket oil can be passed into a bearing gap between the external side of the carrier element and an internal side of the planet gear. The carrier element, which may be what is known as a planet pin, in the circumferential region of a main load direction of the plain bearing, is configured having at least one duct carrying gearbox oil. The duct in the carrier element is provided radially within the external side of the carrier element. Furthermore the duct is embodied having a cross section which is embodied so as to be closed in relation to the bearing gap.

In the present context, the term duct is understood to be a line, or a closed duct through which oil can be carried and which has a round, elliptic or rectangular closed cross section, or a closed cross section embodied in any other suitable way.

The closed cross section of the duct prevents any direct leakage of oil from the duct, and through the external side of the carrier element into the bearing gap In this way, the entire volumetric flow of oil that is directed into the duct passes through the duct and extracts thermal energy from the carrier element, above all in the highly loaded region of the plain bearing. A load-bearing capability of the plain bearing, as well as a service life of the plain bearing, are increased as a result.

In other words, the planetary gearbox according to the present disclosure comprises at least one duct or cooling duct integrated into the plain bearing. The duct is disposed in the plain bearing in such a way that the gearbox oil which is guided through the duct counteracts the unwanted thermal deformations of the plain bearing, particularly in the region of the highly loaded zone of the plain bearing.

The reduced thermal deformations in the region of the carrier element or planet pin counteract an unwanted reduction in the height of the bearing gap close to the main load zone. As a result, a service life is improved in a simple manner in comparison to known embodiments of plain bearings.

In comparison to known solutions, the at least one duct offers the possibility of reducing a maximum operating temperature in the region of the carrier element, this having a positive effect on the thermal stability of the coating in the region of the external side of the carrier element and in the region of the internal side of the planet gear.

Moreover, the duct in the flow direction of the gearbox oil in the duct has at least two sequential duct portions. The flow cross section of the duct in the transition region between the upstream duct portion and the next downstream duct portion decreases in an at least approximately step-shaped manner.

As a result of the at least approximately step-shaped reduction of the flow cross section of the duct, the flow profile of the gearbox oil in the duct, in the transition region between the duct portions, can be influenced such that a thermal transfer between the carrier element and the gearbox oil in the duct is improved by generating a turbulent flow downstream of the transition region, this taking place in a simple manner in terms of construction.

In an embodiment of the planetary gearbox according to the present disclosure, which is easy to produce, the flow cross section of the duct in the region of the duct portions in the flow direction of the gearbox oil can in each case be at least approximately constant.

The at least one duct in the axial direction of the carrier element, at least in the region of an end side of the carrier element, can be embodied so as to be open, and be connected to a discharge device. The oil from the duct, by way of the discharge device, can be able to be guided in the direction of a tooth profile of the planet gear so as to be able to cool and lubricate meshing of the planet gear with a further gear wheel, such as a sun gear, a ring gear and/or a further planet gear.

The discharge device here can be embodied as, for example, a nozzle or the like, by means of which the oil as an oil jet is sprayed onto the toothing.

In an advantageous embodiment of the planetary gearbox according to the present disclosure, the planet carrier is of a rotatably fixed embodiment. With such an embodiment, a main load direction of the plain bearing can enclose an angle of approximately 90° with a radial direction of the planet carrier in the direction of rotation of the planet gear. The at least one duct can then be disposed in a circumferential region of the plain bearing which encloses angular values in a range from 60° to 150°, preferably of from 90° to 135°, with the radial direction of the planet carrier in the direction of rotation of the planet gear. In addition, there is the possibility that the oil feed pocket is disposed outside a circumferential region of the plain bearing which encloses angular values in a range from 10° to 120°, preferably of from 10° to 100°, with the radial direction of the planet carrier in the direction of rotation of the planet gear.

In this embodiment of the planetary gearbox it is guaranteed that the duct is disposed in the region of the main load zone of the plain bearing, in which the heat input into the carrier element is highest. It is then possible by means of the gearbox oil that is passed through the duct to selectively dissipate thermal energy in the region of the main load zone of the plain bearing and to limit thermal deformations resulting from the heat input.

In this embodiment of the planetary gearbox according to the present disclosure, it is additionally guaranteed that the oil feed pocket in the circumferential direction of the plain bearing is disposed outside the highly loaded zone of the plain bearing. The oil can thus be introduced to the desired degree from the oil feed pocket into the bearing gap of the plain bearing.

Furthermore, it is also possible that the planet carrier of the planetary gearbox according to the present disclosure is embodied so as to be rotatable. A main load direction of the plain bearing can then enclose, depending on the operating point, angular values of from 110° to 180° with a radial direction of the planet carrier in the direction of rotation of the planet gear with respect to the carrier element. The at least one duct can be disposed in a circumferential region of the plain bearing which encloses angular values in a range from 110° to 225°, preferably of from 120° to 200°, with the radial direction of the planet carrier in the direction of rotation of the planet gear. In addition, there is the possibility that the oil feed pocket is disposed outside a circumferential region of the plain bearing which encloses angular values in a range from 90° to 190°, preferably of from 30° to 210°, with the radial direction of the planet carrier in the direction of rotation of the planet gear. This guarantees that the oil feed pocket is disposed outside a highly loaded region of the plain bearing and that oil can be introduced into the bearing gap between the planet gear and the carrier element with little effort.

In further embodiments of the planetary gearbox according to the present disclosure, the duct can extend in the carrier element radially inside the external side of the carrier element in the axial direction and/or in the circumferential direction of the carrier element. Thermal energy can then be removed from the highly loaded region of the plain bearing in a manner which is simple in terms of construction, and thermal deformations of the plain bearing can be limited to the desired extent.

According to a further aspect, the duct between the duct portions has a step-shaped incident-flow profile. The volumetric flow of gearbox oil in the region of the incident-flow profile is deflected radially inward in relation to an internal side of the duct. The flow of the volumetric flow of gearbox oil here, downstream of the incident-flow profile within the duct, is deflected in an at least approximately perpendicular manner to the overflowed internal side of the duct, or in terms of the main flow direction of the volumetric flow of gearbox oil, upstream of the incident-flow profile, is deflected in an at least approximately radially inward manner. Pursued here is a deflection which downstream of the incident-flow profile and within the internal side of the duct generates in the volumetric flow of gearbox oil a recirculation zone having at least one release bubble.

At least one flow duct which in the carrier element runs in the direction of a mouth can be provided, the latter in the region of the internal side of the duct being provided downstream of the incident-flow profile, wherein gearbox oil can be directed into the duct by way of the flow duct. Using the volumetric flow of gearbox oil that can be directed from the flow duct into the duct, a preferably laminar flow profile of the gearbox oil in the duct can be converted to a turbulent flow, a thermal transfer between the carrier element the volumetric flow of gearbox oil being able to be improved in this way.

The volumetric flow of gearbox oil that is guided through the flow duct can in each case exit the mouth at an angle in relation to the flow direction of the volumetric flow of gearbox oil in such a manner that a recirculation zone having at least one release bubble is formed within the internal side of the duct downstream of the mouth.

The targeted generation of a recirculation zone with a release bubble in accordance with the present disclosure causes a transition from a laminar flow profile to a turbulent flow profile of the flow of the volumetric flow of gearbox oil in the duct. As a result, the thermal transfer coefficient on the internal side of the duct already increases after a relatively short running time. Furthermore, the mean quantity of heat transferred in relation to the surface area of the duct required for this is increased in comparison to solutions known from the prior art.

The turbulent boundary layer which attaches itself to the surface of the heat exchanger again after the recirculation zone significantly improves the thermal transfer between the carrier element and the gearbox oil carried through the duct.

Owing to the thermal transfer coefficient increased in the manner described in more detail above, there is in turn the possibility of conceiving the dimensions of the duct, and of the volumetric flow of gearbox oil guided through said duct, so as to be correspondingly small without reducing the temperature-control performance. As a result, weight savings and material savings and an oil circuit which can under some circumstances be dimensioned to be smaller in the region of the carrier element are possible. Furthermore, if the duct has dimensions which are approximately comparable to those of conventionally embodied ducts with a substantially constant flow cross section, there is also the possibility that a higher quantity of heat is discharged from the carrier element by way of the gearbox oil guided through the duct.

The flow duct can be disposed so as to at least in regions run in the radial direction of the carrier element between the external side of the carrier element and the duct and/or radially within the duct in the carrier element.

Furthermore, there is the possibility that an aperture is provided upstream of the duct, by way of which aperture a volumetric flow from a gearbox oil supply into the duct is delimited, the flow duct also being supplied with gearbox oil from said gearbox oil supply. It is achieved as a result that a volumetric flow of gearbox oil which, downstream of the mouth generates a recirculation zone having at least one release bubble within the internal side of the duct, is in each case guided through the flow duct.

The recirculation zone or the release bubble may have a defined length in the flow direction of the volumetric flow of gearbox oil in the duct, said length being a function of a height of the effective area of the incident-flow profile. Here, the effective area of the incident-flow profile corresponds to an area of the incident-flow profile projected into a plane which is perpendicular to the flow direction of the volumetric flow of gearbox oil.

According to a further aspect of the present disclosure, the volumetric flow of gearbox oil in the region of the incident-flow profile in the region of the mouth is deflected radially inward in relation to the internal side of the duct. In the flow direction of the volumetric flow of gearbox oil, a reattachment zone adjoins the recirculation zone. As a result, a further improvement of the thermal transfer coefficient in comparison to known planetary gearboxes is achieved in a simple manner.

The mouth here can be disposed at least approximately in the region of the internal side of the duct in which the respective recirculation zone terminates.

The duct can have at least one further, or third, duct portion, respectively, which in the flow direction of the volumetric flow of gearbox oil in the duct adjoins the second duct portion. The flow cross section of the duct in the transition region between the second duct portion and the third duct portion can be reduced in an at least approximately step-shaped manner In this instance, a further incident-flow profile is provided in the transition region between the second duct portion and the third duct portion, said further incident-flow profile being disposed downstream of the incident-flow profile in the duct and protruding inward in terms of the internal side of the duct, being impacted by an incident flow of the volumetric flow of gearbox oil and deflecting the volumetric flow of gearbox oil in the duct. The volumetric flow of gearbox oil in the region of the further incident-flow profile here is deflected in such a manner that a further recirculation zone in which there is in each case at least one release bubble present is established downstream of the further incident-flow profile in the duct.

The targeted generation of recirculation zones with release bubbles in accordance with the present disclosure causes in each case a transition from a laminar flow profile to a turbulent flow profile of the flow of the volumetric flow of gearbox oil in the duct. As a result, the thermal transfer coefficient on the internal side of the duct already increases after a relatively short running time. Furthermore, the mean quantity of thermal transferred in relation to the surface area of the heat exchanger required for this is increased in comparison to solutions known from the prior art.

If a spacing between two respective incident-flow profiles in the flow direction of the volumetric flow of gearbox oil is in a range between one times and ten times the height of the respective front incident-flow profile in the flow direction of the volumetric flow of gearbox oil, a high degree of thermal transmission capability in the region of the duct and at the same time small dimensions of the duct can be achieved. Here, it may be provided that the spacing between two respective incident-flow profiles lies in a range between four and five times the height of the front incident-flow profile.

In an embodiment of the heat exchanger according to the present disclosure which is simple in terms of construction, the step-shaped incident-flow profiles extend at least approximately transversely to the flow direction of the volumetric flow of gearbox oil.

In a further embodiment of the planetary gearbox according to the present disclosure which is simple in terms of construction, the step-shaped incident-flow profiles are at least regionally embodied with a convex and/or planar end face that is directed counter to the flow of the volumetric flow of gearbox oil, said end faces enclosing in each case an angle of between 0° and 90° with the internal sides of the duct portions. It is thus possible in a simple manner for relatively long or relatively short recirculation zones or release bubbles to be generated in a manner dependent on the respective construction mode of the carrier element present. Here, the length of the recirculation zones or of the release bubbles, respectively, can be controlled or generated by means of the geometrical shape of separation edges between the end faces of the incident-flow profiles and the internal faces of the duct portions In addition, there is the possibility that the planetary gearbox according to the present disclosure has a plurality of ducts, which are provided so as to run in the axial direction and/or in the circumferential direction of the carrier element. It is thereby possible, in the region of the carrier element, to remove thermal energy to the desired extent from the highly loaded region over a larger region in the circumferential direction, and to delimit thermal deformations of the plain bearing to the required extent.

If the ducts are fluidically connected to one another, a complexity in terms of construction for the introduction of gearbox oil into the ducts is delimited in a simple manner. This is the case when the gearbox oil is introduced into one of the ducts and then passed on from said duct into a further duct or into further ducts.

The duct or ducts downstream of a feed region of the gearbox oil into the duct or ducts can be fluidically connected to the at least one oil feed pocket. It is then preferably necessary to provide just one feed for the oil which is to be passed through the duct or ducts, and additionally for the gearbox oil which is to be introduced into the bearing gap of the plain bearing. This is a simple way of delimiting a complexity in terms of construction.

In addition, power losses are also reduced thereby. This results from the fact that the gearbox oil which is introduced into the duct or ducts is carried directly from the duct or ducts to the oil feed pocket. The circuitous route for the oil, proceeding from the duct or ducts, by way of a gearbox return into an oil circuit and only then to the oil feed pocket gives rise to losses which do not occur when the oil feed pocket is supplied directly from the duct or ducts.

In a further embodiment of the planetary gearbox according to the present disclosure, a feed region by way of which the oil is able to be directed into the carrier element is provided. The feed region can be connected to the duct or to the ducts and to the at least one oil feed pocket by way of lines in the carrier element. The oil which by way of the feed region is directed into the carrier element, by way of the lines can to one part be guided into the duct or into the ducts, and to the other part into the oil feed pocket.

Depending on the respective specific application, the duct or ducts can each have diameters of between 5 mm and 15 mm.

The ducts can be operatively connected to the feed regions in such a manner that gearbox oil is guided in co-current or countercurrent flow at least in two ducts extending adjacent to one another in the carrier element. Particularly when guiding the gearbox oil or the gearbox oil in countercurrent flow, a temperature profile which is as uniform as possible can be achieved in the circumferential direction and/or in the axial direction of the carrier element, said temperature profile having a positive effect on the service life of the plain bearing and thus of the planetary gearbox.

In another planetary gearbox embodiment in accordance with the present disclosure which is simple in terms of construction, at least the two adjacent ducts through which the gearbox oil is guided in co-current flow are each operatively connected on the inlet side to the feed region for the gearbox oil.

Furthermore, it can be provided that at least one of the two ducts through which the gearbox oil is guided in countercurrent flow is operatively connected on the inlet side to the feed region and connected on the outlet side to the inlet side of the adjacent duct.

The carrier element, at least in regions, can be embodied with a clearance provided radially within the external side. Here, there is the possibility that at least one region of the duct or at least of one of the ducts is embodied in the region of the inner clearance as a groove which extends in the radial direction and/or in the circumferential direction of the carrier element. The groove can be sealed in relation to the environment of the carrier element by a further component, thereby in a simple manner avoiding leaks and associated power losses as well as a reduction in the cooling capacity.

The further component part and the carrier element can delimit a region which carries gearbox oil and which establishes a connection between the outlet of the duct or between at least one outlet of one of the ducts and the oil feed pocket. This makes it possible once again to establish the connection between the duct or ducts and the oil feed pocket in a manner which is simple in terms of construction.

The region carrying gearbox oil can be connected to the oil feed pocket in a manner which is simple in terms of construction, by a hole which runs radially in the carrier element.

In the case of a gas turbine engine as described and claimed herein, a combustion chamber may be provided axially downstream of the fan and of the compressor(s). For example, the combustion chamber may lie directly downstream of the second compressor (for example at the exit of the latter), when a second compressor is provided. By way of a further example, the flow at the exit of the compressor may be fed to the inlet of the second turbine, when a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of attack of said variable stator blades may be variable). The row of rotor blades and the row of stator blades may be axially offset from one another.

The or each turbine (for example the first turbine and the second turbine as described above) may comprise any number of stages, for example a plurality of stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of magnitude of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios can commonly be referred to as the hub-to-tip ratio. The radius at the hub and the radius at the tip can both be measured at the leading peripheral part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about a rotation axis. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading under cruise conditions may be more than (or of the order of magnitude of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure may have any desired bypass ratio, wherein the bypass ratio is defined as the ratio of the mass flow rate of the flow through the bypass duct to the mass flow rate of the flow through the core under cruise conditions. In the case of some arrangements, the bypass ratio may be more than (or of the order of magnitude of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and claimed herein may be defined as the ratio of the stagnation pressure upstream of the fan to the stagnation pressure at the exit of the highest pressure compressor (before the entry to the combustion chamber). By way of a non-limiting example, the overall pressure ratio of a gas turbine engine as described and claimed herein at cruising speed may be greater than (or of the order of magnitude of): 35, 40, 45, 50, 55, 60, 65, 70, 75. The overall pressure ratio may be in an inclusive range delimited by two of the values in the previous sentence (that is to say that the values may form upper or lower limits).

The specific thrust of a gas turbine engine may be defined as the net thrust of the gas turbine engine divided by the total mass flow through the engine. The specific thrust of an engine as described and/or claimed herein under cruise conditions may be less than (or of the order of magnitude of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such gas turbine engines can be particularly efficient in comparison with conventional gas turbine engines.

A gas turbine engine as described and claimed herein may have any desired maximum thrust. Purely by way of a non-limiting example, a gas turbine as described and/or claimed herein may be capable of generating a maximum thrust of at least (or of the order of magnitude of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of magnitude of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET during use of the engine may for example be at least (or of the order of magnitude of): 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade as described herein may be manufactured from any suitable material or a combination of materials. For example, at least a part of the fan blade and/or of the aerofoil may be manufactured at least in part from a composite, for example a metal matrix composite and/or an organic matrix composite, such as carbon fiber. By way of a further example, at least a part of the fan blade and/or of the aerofoil may be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a leading periphery of titanium.

A fan as described herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of a further example, the fan blades may be formed integrally with a central portion. Such an arrangement may be referred to as a blisk or a bling. Any arbitrary suitable method may be used for production of such a blisk or bling. For example, at least some of the fan blades may be machined from a block and/or at least some of the fan blades may be attached to the hub/disk by welding, such as linear friction welding, for example.

The gas turbine engines as described and claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine engine as described and claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions during the middle part of the flight, for example the conditions experienced by the aircraft and/or the gas turbine engine at the midpoint (in terms of time and/or distance) between the end of an ascent and the start of a descent.

Purely by way of an example, the forward speed under the cruise condition may be any point in the range from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine as described and claimed herein may operate at the cruise conditions defined elsewhere herein. Such cruise conditions may be determined by the cruise conditions (for example the conditions during the middle part of the flight) of an aircraft to which at least one (for example 2 or 4) gas turbine engine(s) can be fastened in order to provide thrust force.

Moreover, a plain bearing for a planetary gearbox, in particular for a planetary gearbox of a gas turbine engine of an aircraft, is proposed. The plain bearing comprises a static axle and a component part rotatably mounted on the axle. At least one oil feed pocket is provided in the region of an external side of the axle, by way of which oil feed pocket oil can be passed into a bearing gap between the external side of the axle and an internal side of the rotatable component part. In the circumferential region of a main load direction of the plain bearing, the axle is configured with at least one duct carrying gearbox oil. The duct in the axle is provided radially within the externa side of the axle, so as to at least in regions run in the axial direction of the axle, and is embodied with a cross section that is closed in relation to the bearing gap.

The closed cross section of the duct prevents any direct leakage of oil from the duct into the bearing gap In this way, the entire volumetric flow of oil that is directed into the duct passes through the duct and extracts thermal energy from the carrier element, above all in the highly loaded region of the plain bearing. A load-bearing capability of the plain bearing, as well as a service life of the plain bearing, are increased as a result.

The at least one duct of the plain bearing according to the present disclosure in the axial direction of the static axle, at least in the region of an end side of the axle, can be embodied so as to be open, and be connected to a discharge device. The oil from the duct can be able to be guided in the direction of a tooth profile of the rotatable component, which may be configured as a gear wheel, by way of the discharge device, so as to be able to cool and lubricate meshing of the component with another gear wheel, such as a sun gear, a ring gear and/or a further planet gear.

The discharge device here can be embodied as a nozzle or the like, by means of which the oil as an oil jet is sprayed onto the toothing.

The duct can furthermore be embodied as a stepped bore, wherein the flow cross section of the duct in the flow direction of the gearbox oil decreases in each case in a step-shaped manner. There is the possibility here that the stepped bores, or the duct portions of the duct, respectively, are disposed so as to be mutually concentric or eccentric.

In the case where the axle is connected to a non-rotatable component part in a manner precluding relative rotation, a main load direction of the plain bearing can enclose an angle of about 90° with a radial direction of the non-rotatable component part in the direction of rotation of the rotatable component part. In addition, there is the possibility that the at least one duct is arranged in a circumferential region of the axle which encloses angular values in a range from 60° to 150°, preferably of from 90° to 135°, with the radial direction of the non-rotatable component part in the direction of rotation of the rotatable component part. Furthermore, in the circumferential direction, the oil feed pocket can be arranged outside a circumferential region of the axle which encloses angular values in a range from 10° to 120°, preferably of from 10° to 100°, with the radial direction of the non-rotatable component part in the direction of rotation.

Moreover, the axle can be connected to a further non-rotatable component part in a manner precluding relative rotation. Depending on the operating point, a main load direction of the plain bearing then encloses angular values of from 110° to 180° with a radial direction of the further rotatable component part in the direction of rotation of the rotatable component part. The at least one duct in this instance can be disposed in a circumferential region of the axle, which encloses angular values in a range from 110° to 225°, preferably from 120° to 200°, with the radial direction of the further rotatable component in the rotation direction of the rotatable component. In addition, there is the possibility that, in the circumferential direction, the oil feed pocket is arranged outside a circumferential region of the axle which encloses angular values in a range from 90° to 190°, preferably of from 30° to 210°, with the radial direction of the further rotatable component part in the direction of rotation of the rotatable component part.

In other advantageous embodiments of the plain bearing according to the present disclosure, the duct can extend in the axle radially inside the external side of the axle in the axial and/or in the circumferential direction of the axle.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The present disclosure is not restricted to the indicated combination of features of the additional independent claims or claims dependent thereon. There are furthermore possibilities of combining individual features, including those which emerge from the claims, the following description of embodiments and directly from the drawing, with one another. Reference to the drawings by the claims through the use of reference signs is not intended to restrict the scope of protection of the claims.

Preferred refinements emerge from the dependent claims and the description hereunder. Exemplary embodiments of the subject matter according to the present invention are explained in greater detail with reference to the drawing, without being restricted thereto. In the drawing:

FIG. 4 shows a highly schematic isolated illustration of a planet pin of the planetary gearbox according to FIG. 3, on which a planet gear is rotatably mounted;

FIG. 5 shows a schematic longitudinal view of the planet pin according to FIG. 4 along a section line IV-IV denoted more specifically in FIG. 4;

FIG. 10 shows an enlarged view of a region X denoted more specifically in FIG. 6;

FIG. 11 shows an enlarged view of a region XI denoted more specifically in FIG. 8; and FIG. 12 shows an enlarged view of a region XII denoted more specifically in FIG. 9.

Figure 1:
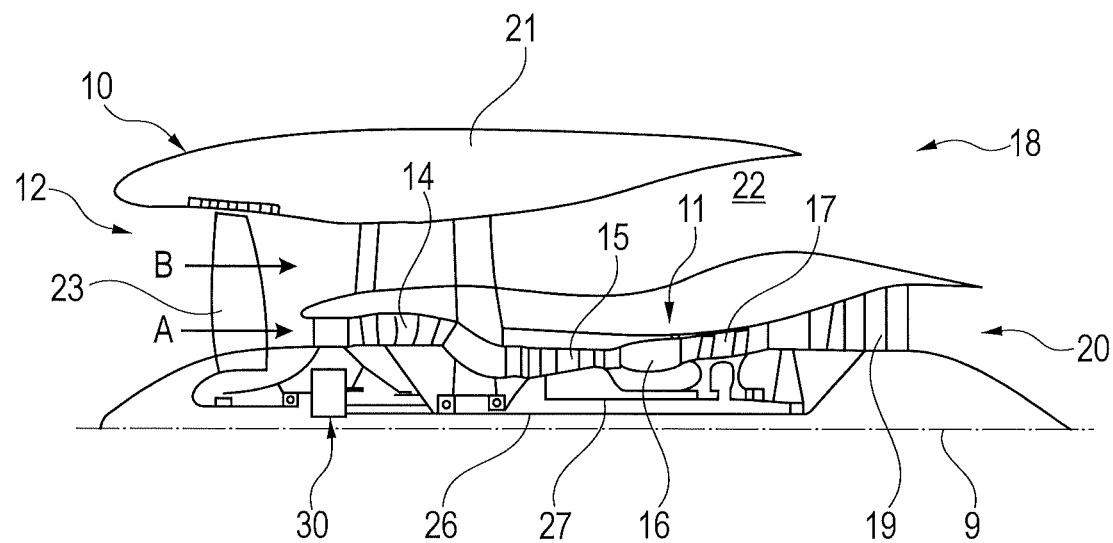
FIG. 1 shows a schematic longitudinal sectional view of a gas turbine engine.

FIG. 1 illustrates a gas turbine engine 10 having a main axis of rotation 9. The engine 10 comprises an air inlet 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 by way of a shaft 26 and an epicyclic gearbox 30 is attached to the low-pressure turbine 19 and is driven by the latter. The shaft 26 is also referred to here as the core shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then propagate through the high-pressure and the low-pressure turbine 17, 19 and drive the latter as a result, before said combustion products for providing a specific thrust force are ejected by the nozzle 20 The high-pressure turbine 17 drives the high-pressure compressor 15 by way of a suitable connecting shaft 27, which is also referred to as the core shaft. The fan 23 generally provides the major part of the thrust force. The epicyclic gearbox 30 is a reduction gearbox.

Figure 2:
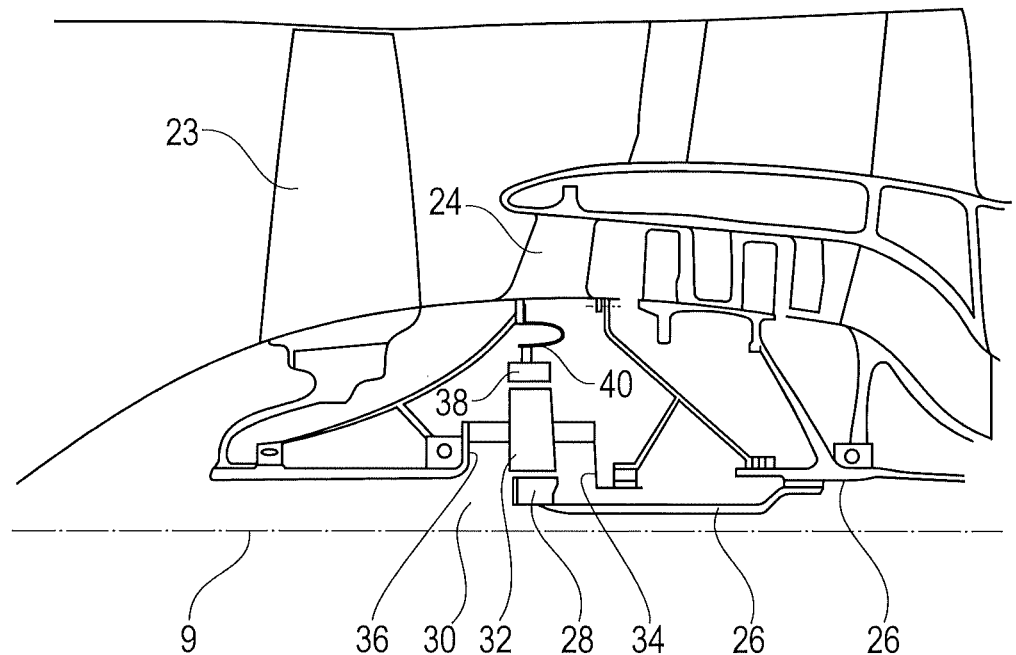
FIG. 2 shows an enlarged, partial, longitudinal sectional view of an upstream portion of a gas turbine engine.

An exemplary arrangement for a geared-fan gas turbine engine 10 is shown in FIG. 2. The low-pressure turbine 19 (see FIG. 1) drives the shaft 26, which is coupled to a sun gear 28 of the epicyclic gearbox arrangement 30. Multiple planet gears 32, which are coupled to one another by means of a planet carrier 34, are situated radially to the outside of the sun gear 28 and mesh with the latter and are arranged in each case rotatably on carrier elements or planet pins 42, which are connected rotationally fixedly to the planet carrier 34 and which are shown in more detail in FIG. 3. The planet carrier 34 limits the planet gears 32 to orbiting about the sun gear 28 in a synchronous manner while enabling each planet gear 32 to rotate about its own axis on the planet pins 42, which represent static axes. The planet carrier 34 is coupled by way of linkages 36 to the fan 23 so as to drive the rotation of the latter about the engine axis 9. Radially to the outside of the planet gears 32 and meshing therewith is an outer gear wheel or ring gear 38 that is coupled, by way of linkages 40, to a stationary support structure 24.

It is noted that the terms "low-pressure turbine" and "low-pressure compressor" as used here can be understood to mean that they comprise the turbine stage with the lowest pressure, or the compressor stage with the lowest pressure, respectively, (i.e. that they do not comprise the fan 23) and/or the turbine and compressor stage which are connected to one another by way of the connecting shaft 28 with the lowest rotating speed in the engine (i.e. that they do not comprise the gearbox output shaft which drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
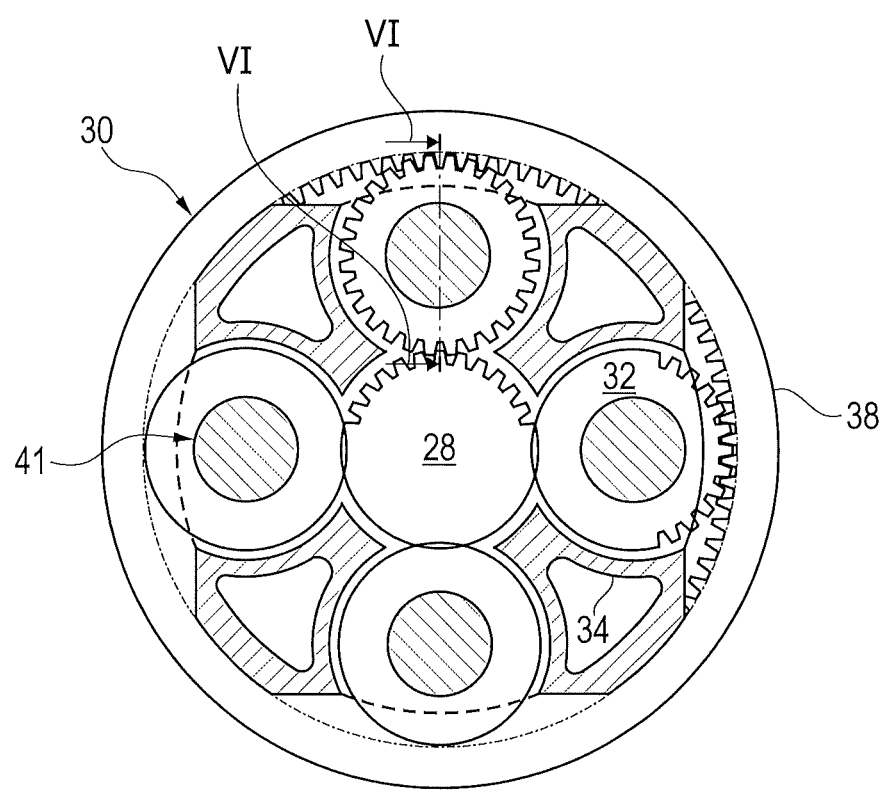
FIG. 3 shows a stand-alone illustration of a gearbox for a gas turbine engine.

The epicyclic gearbox 30 will be shown in more detail by way of example in FIG. 3. Each of the sun gear 28, the planet gears 32 and the ring gear 38 comprise teeth about their periphery for meshing with the other toothed gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gearbox 30 generally comprise at least three planet gears 32.

The epicyclic gearbox 30 illustrated by way of example in FIGS. 2 and 3 is a planetary gearbox in which the planet carrier 34 by way of a linkage 36 is coupled to an output shaft, wherein the ring gear 38 is fixed. However, any other suitable type of epicyclic gearbox 30 may be used. As a further example, the epicyclic gearbox 30 may be a star arrangement, in which the planet carrier 34 is held fixed, with the ring gear (or outer gear wheel) 38 being allowed to rotate. In the case of such an arrangement, the fan 23 is driven by the ring gear 38. As a further alternative example, the gearbox 30 can be a differential gearbox in which the ring gear 38 as well as the planet carrier 34 are allowed to rotate.

It will be appreciated that the arrangement shown in FIGS. 2 and 3 is merely exemplary, and various alternatives fall within the scope of protection of the present disclosure. Purely as an example, any suitable arrangement may be used for positioning the gearbox 30 in the engine 10, and/or for connecting the gearbox 30 to the engine 10. By way of a further example, the connections (such as the linkages 36, 40 in the example of FIG. 2) between the gearbox 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gearbox and the fixed structures, such as the gearbox casing) may be used, and the disclosure is not limited to the exemplary arrangement of FIG. 2. For example, it is readily obvious to the person skilled in the art that the arrangement of the output and support linkages and the positioning of bearings in a star arrangement (described above) of the gearbox 30 typically would differ from those shown by way of example in FIG. 2.

Accordingly, the present disclosure extends to a gas turbine engine having an arbitrary arrangement of gearbox types (for example star-shaped or planetary), support structures, input and output shaft arrangement, and bearing positions.

Optionally, the gearbox may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has a dedicated nozzle that is separate from and radially outside the engine core nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine.

The geometry of the gas turbine engine 10, and components thereof, is or are defined using a conventional axis system which comprises an axial direction X (which is aligned with the axis of rotation 9), a radial direction Y (in the direction from bottom to top in FIG. 1), and a circumferential direction U (perpendicular to the view in FIG. 1). The axial, radial and circumferential directions X, Y and U are mutually perpendicular.

FIG. 4 shows the planet pin 42 in isolation in a highly schematic side view, while the planet pin 42 in FIG. 5 is shown in a longitudinal sectional view. A first circular line 42A1 shown in FIG. 4 corresponds to the diameter of the planet pin 42 when the latter is substantially at the ambient temperature of the gas turbine engine 10. In contrast, the further line 42B1 corresponds to the circumference of the planet pin 42 during the operation of the gas turbine engine 10 of a planetary gearbox 30 embodied in a conventional way. In addition, the arrow 43 indicates the main load direction of the plain bearing 41 between the planet gear 32 and the planet pin 42.

The main load direction 43 corresponds to the direction of the resultant bearing force of the plain bearing 41, which is composed of the bearing force component FD and the further bearing force component FF. The bearing force component FD in each case results from the torque applied to the planetary gearbox 30. The further bearing force component FF results from the centrifugal force which acts on the planet gear 32 when the planet carrier 34 is rotating during the operation of the planetary gearbox.

If the planet carrier 34 is of non-rotatable design, the main load direction 43 of the plain bearing 41 corresponds substantially to the direction of bearing force component FD since there is then no centrifugal force acting on the planet gear 32. In addition, the direction of rotation of the planet gear 32 is indicated in FIG. 4 by the reference sign 44.

Bearing force component FD encloses an angle phi equal to 90°, in the direction of rotation 44 of the planet gear 32, with the radial direction of extent of the planet carrier 34, which is the same as the radial direction y in FIG. 4 and passes through the center of the planet pin 42 and the radially outer point 45. Bearing force component FF encloses an angle phi equal to 180°, in the direction of rotation 44 of the planet gear 32, with the radial direction of extent of the planet carrier 34.

When the planet carrier 34 is of rotatable design, the angular value of the angle phi which the main load direction 43 encloses with the radial direction of the planet carrier 34 varies in a range from 110° to 180°, depending on the operating state.

During the operation of the gas turbine engine 10, the outside diameter of the planet pin 42 on the line 42B1 increases to a greater and greater extent in the direction of rotation 44 of the planet gear 32, starting from a radially outer point 45 on an external side 46 of the planet pin 42. In the region of the planet pin 42 which surrounds the main load direction 43 at the circumference, the outside diameter of the planet pin 42 differs to a substantially greater extent from the circular line 42A than at the radially outer point 45 on the external side 46 of the planet pin 42. This results from the fact that the non-rotating planet pin 42, which is connected to the planet carrier 34 in a manner precluding relative rotation, is subject to the greatest heat input in the region of the main load direction 43. This is the case because a bearing gap 63 of the plain bearing 41 between an external side 46 of the planet pin 42 and an internal side 64 of the planet gear 32 is at its smallest here owing to the acting load.

In contrast, the rotating planet gear 32 does not have locally limited heating corresponding to the planet pin 42 on account of the rotation and thermal inertia. For this reason, the inside diameter of the planet gear 32 expands uniformly in the circumferential direction as the operating temperature of the planetary gearbox 30 increases.

Owing to the different expansion behavior of the planet pin 42 and the planet gear 32, the height of the bearing gap 63 of the plain bearing 41 is reduced to an even greater extent in the main load zone extending around the main load direction 43 in the circumferential direction U. In the region of the main load zone of the plain bearing 41 and especially in the planet pin 42, this results in very high operating temperatures in a locally limited area. These high operating temperatures prejudice a service life of the plain bearing 41 to an unwanted extent.

FIG. 5 shows a longitudinal sectional view of the planet pin 42 along a section line V-V denoted more specifically in FIG. 4. From the illustration according to FIG. 5, it is evident that the planet pin 42 at relatively high operating temperatures expands to a greater extent centrically than in the region of its ends.

Figure 6:
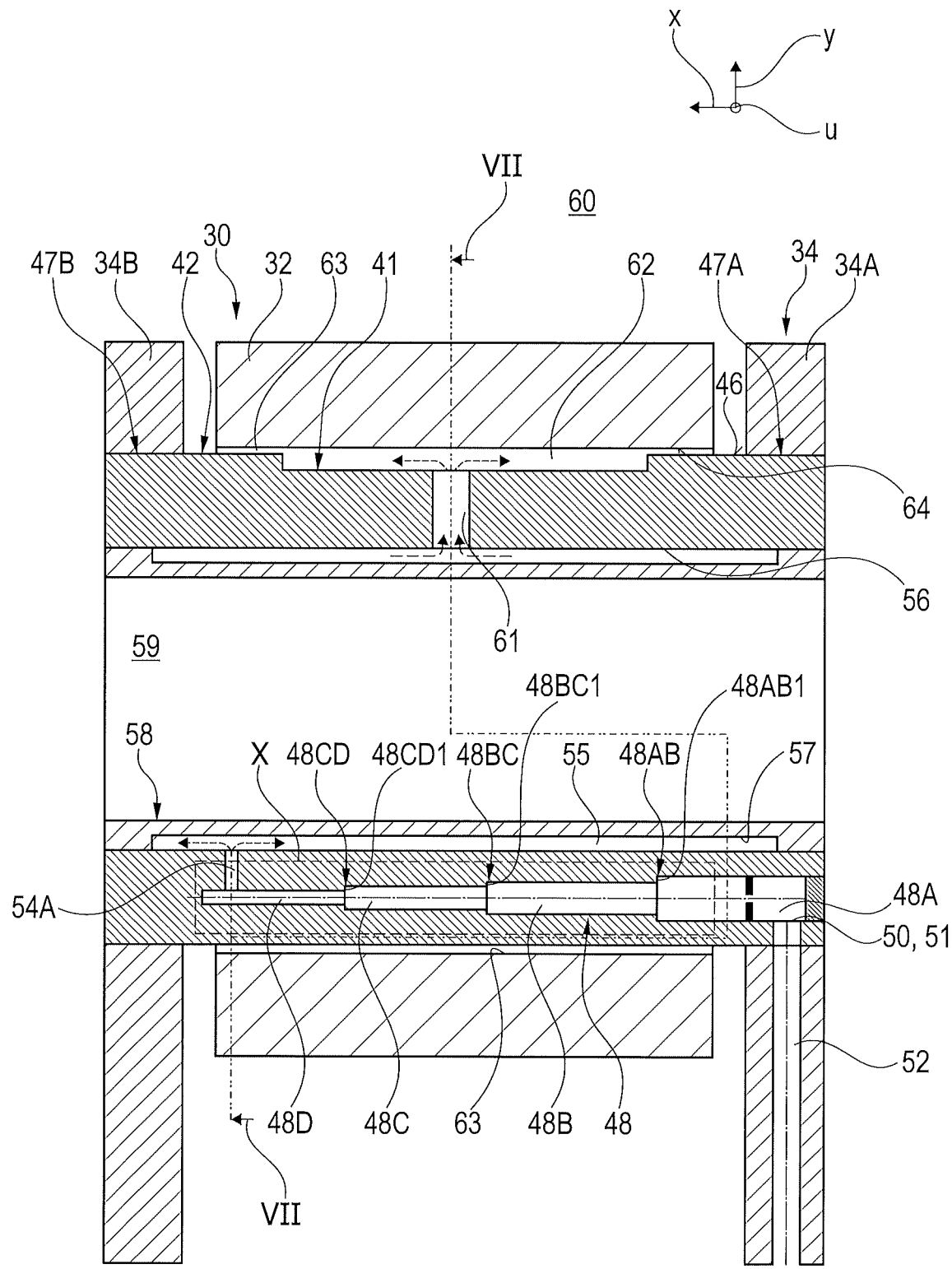
FIG. 6 shows a sectional view of an embodiment of the planetary gearbox along a section line VI-VI denoted more specifically in FIG. 3.

FIG. 6 shows a partial longitudinal sectional view of the planetary gearbox 30 along a section line VI-VI denoted more specifically in FIG. 3. The planet carrier 34 comprises two cheeks 34A and 34B spaced apart in the axial direction X. The planet pin 42 is disposed non-rotatably at the ends in respective holes 47A and 47B in the side plates 34A and 34B of the planet carrier 34. In addition, FIG. 7 shows a cross-sectional view of the planetary gearbox 30 along a section line VII-VII denoted more specifically in FIG. 6.

Figure 7:
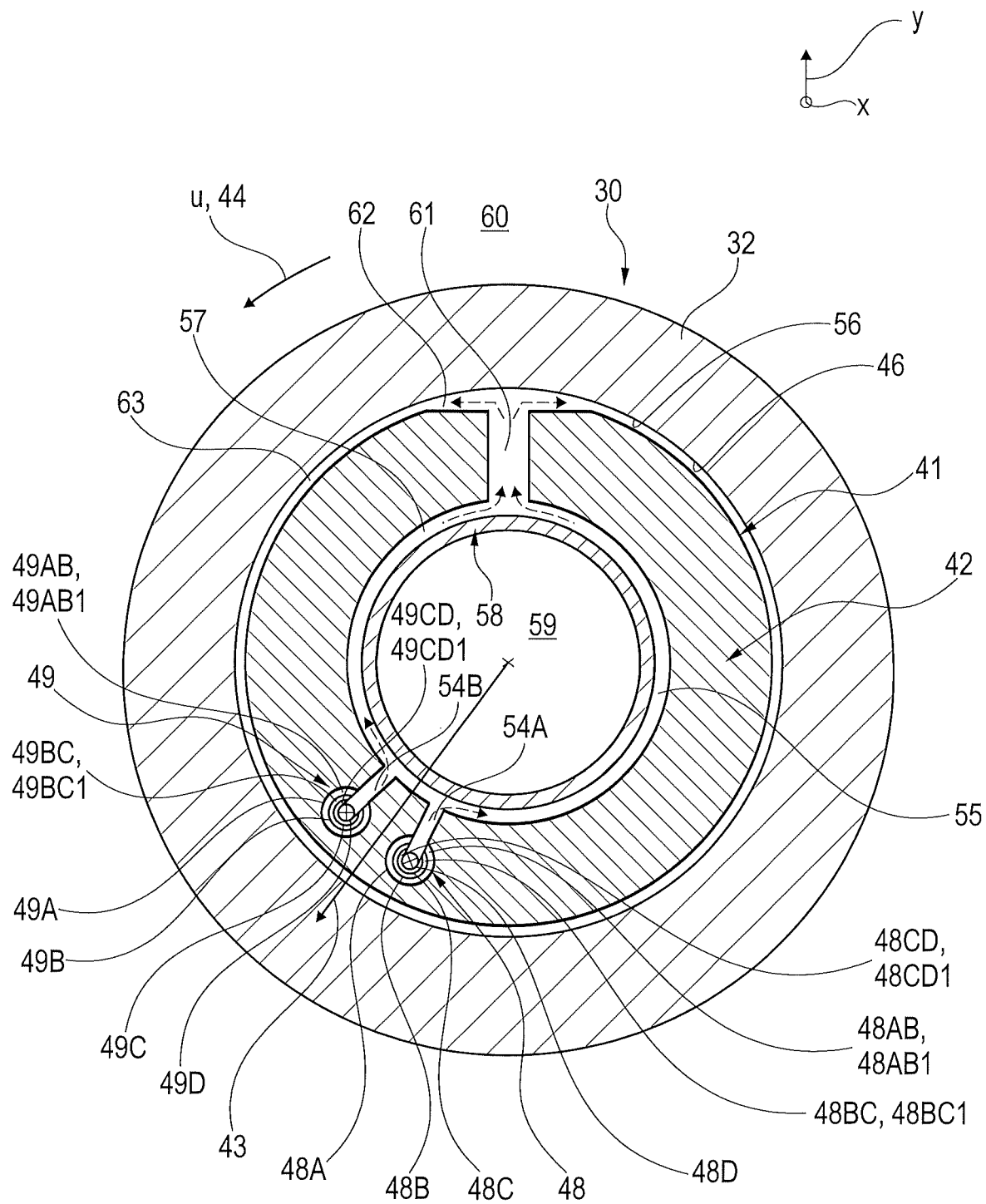
FIG. 7 shows a sectional view of the embodiment of the planetary gearbox shown in FIG. 6 along a section line VII-VII denoted more specifically in FIG. 6.

From the illustrations according to FIG. 6 and FIG. 7, it is evident that two ducts 48, 49 are provided in the planet pin 42 around the main load direction 43 or in the circumferential direction U around the main load direction 43 in the region of the main load zone. The ducts 48, 49 extend in the axial direction X in the planet pin 42, radially inside the external side 46. Gearbox oil from an oil feed line 52 is directed in the ducts 48 and 49 laterally by way of the inlets 50, 51. The ducts 48, 49 are in each case embodied as stepped blind bores and comprise in each case four duct portions 48A to 48D, or 49A to 49D, respectively. The duct portions 48A to 48D, or 49A to 49D, respectively, in the exemplary embodiment of the planetary gearbox 30 illustrated in FIG. 5 are disposed so as to be mutually concentric and in further embodiments of the planetary gearbox may also be produced so as to be mutually eccentric.

The flow diameter of the ducts 48, 49 are in each case reduced in a step-shaped manner in the transition regions 48AB, 48BC, 48CD or 49AB, 49BC, 49CD, respectively, between the duct portions 48A and 48B, 48B and 48C, 48C and 48D or 49A and 49B, 49B and 49C, 49C and 49D, respectively. This has the effect that the previously substantially laminar flow of the gearbox oil in the duct portions 48A to 48C or 49A to 49C, respectively, when overflowing the transition regions 48AB, 48BC, 48CD or 49AB, 49BC, 49CD, respectively, is converted to a turbulent flow so as to improve the dissipation of heat from the highly loaded zone of the planet pin 42 by means of the gearbox oil carried through the ducts 48, 49.

In the exemplary embodiment of the gearbox 30 which is illustrated in FIG. 6 and FIG. 7, the gearbox oil is guided in co-current flow from the inlets 50 and 51 of the two ducts 48 and 49 in the direction of further holes 54A, 54B, which extend radially inward. The holes 54A, 54B open into an annular space 55, which is bounded by an internal side 56 of the planet pin 42 of hollow-cylindrical design and an external side 57 of an inner sleeve 58. The inner sleeve 58 is press-fitted into a hole 59 in the planet pin 42 and seals off the annular space 55 from the environment 60 of the annular space 55 at each of the ends.

The annular space 55 is connected fluidically, by way of a further hole 61, which extends outward in the radial direction Y in the planet pin 42, to what is known as an oil feed pocket 62 of the plain bearing 41. Presently, the oil feed pocket 62 is provided in the region of the radially outer point 45 of the planet pin 42 and hence also of the plain bearing 41. In this way, in the circumferential direction U of the planet pin 42, the oil feed pocket 62 is disposed in a region of the plain bearing 41 which is subject to low loads. It is guaranteed as a result that oil which by way of the further bore 61 is fed into the oil feed pocket 62 makes its way into the bearing gap 63 of the plain bearing 41 in the desired manner during the rotation of the planet gear 32.

The ducts 48, 49, depending on the respective specific application, are disposed in a circumferential region of the plain bearing 41 which encloses angular values of the angle phi in a range from 110° to 225°, preferably of from 120° to 200°, with the radial direction Y of the planet gear 32 in the direction of rotation 44 of the planet gear 32. Additionally, there is the possibility that the oil feed pocket 62 is disposed outside a circumferential region of the plain bearing 41 which encloses angular values of the angle phi in a range from 90° to 190°, preferably from 30° to 210°, with the radial direction Y of the planet carrier 34 in the rotation direction 44 of the planet gear 32. This ensures that the oil feed pocket 62 is arranged outside a highly loaded region of the plain bearing 41 and that oil can be introduced into the bearing gap 63 between the planet gear 32 and the planet pin 42 with little effort.

Figure 8:
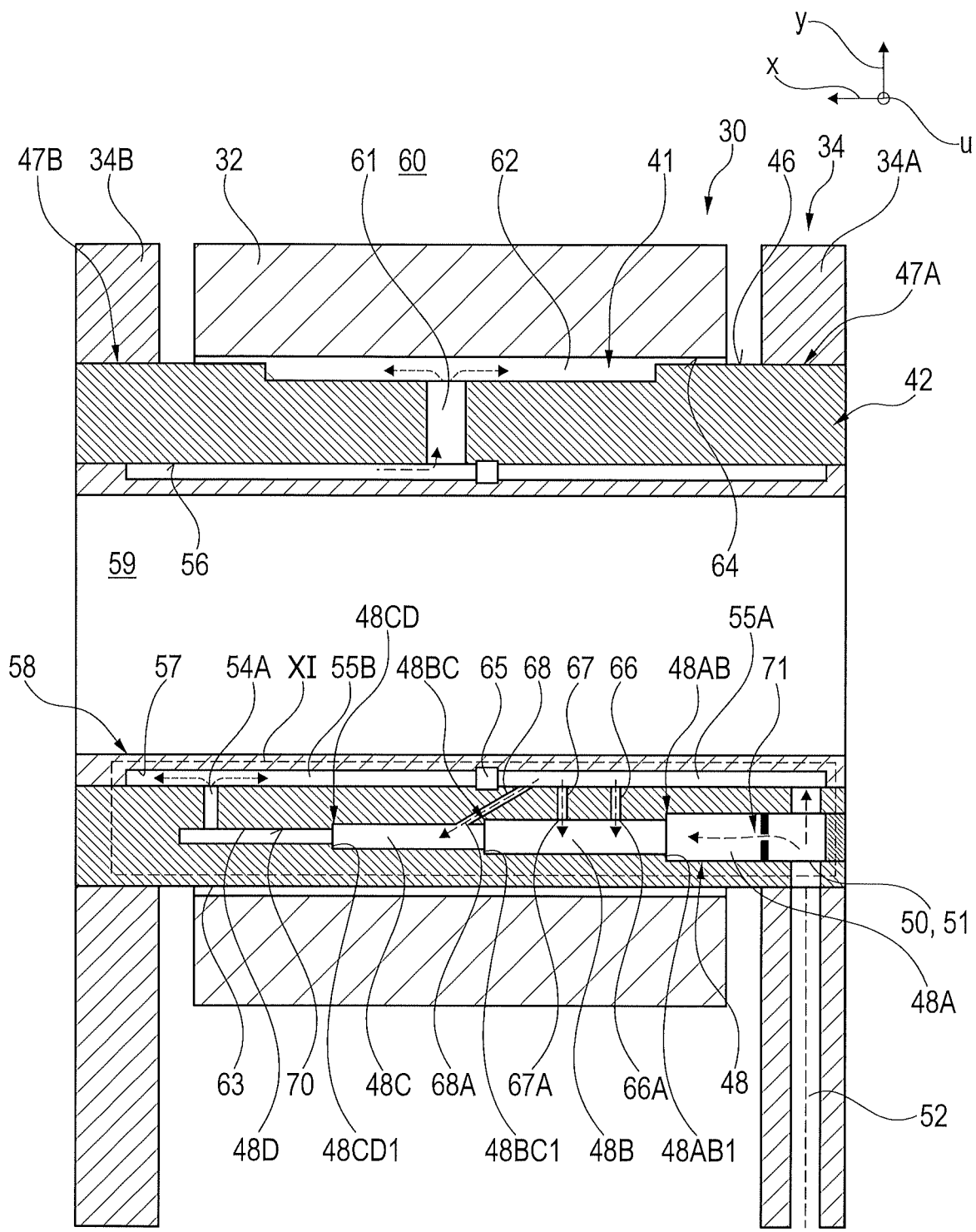
FIG. 8 shows an illustration corresponding to that of FIG. 6 of a further embodiment of the planetary gearbox according to FIG. 3.

FIG. 8 shows an illustration corresponding to FIG. 6 of a further embodiment of the planetary gearbox 30, the fundamental design of which corresponds substantially to that described with reference to FIG. 6 and FIG. 7. For this reason, only the differences in terms of construction between the planetary gearbox 30 according to FIG. 8 and the planetary gearbox 30 according to FIG. 6 are explored in detail below.

In the embodiment of the planetary gearbox 30 according to FIG. 8, the annular space 55 in the axial direction X is subdivided into a first annular space region 55A and second annular space region 55B by a separation ring 65. Here, the first annular space region 55A, like the ducts 48, 49, is connected to the oil feed line 52 and is impinged with gearbox oil. Presently, three flow ducts 66 to 68 branch off from the annular space region 55A, wherein only the flow ducts 66 to 68, which from the annular space region 55A open into the duct 48, are shown in FIG. 8. Further flow ducts which run between the annular space region 55A and the duct 49 and are based substantially on the same functionality as the flow ducts 66 to 68, are not illustrated in more detail in the drawing. Mouth regions 66A and 67A of the flow ducts 66, 67 are provided in an internal side 70 of the duct 48, in the region of the second duct portion 48B. The flow ducts 66 and 67 run in the radial direction Y of the plain bearing 41 and with the axial direction X of the planet pin 42 enclose an angle α of approximately 90°. A mouth region 68A of the flow duct 68 is likewise disposed in the internal side 70 of the duct 48 and in the region of the third duct portion 48C. The profile of the flow duct 68 encloses an angle α of approximately 30° with the axial direction X of the planet pin 42.

An aperture 71 is disposed in the first duct portion 48A. A volumetric flow of gearbox oil from the oil feed line 52 in the direction of the duct 48 is delimited by means of the aperture 71, in this way guaranteeing an adequate supply of the annular space region 55A with gearbox oil from the oil feed line 52.

Figure 9:
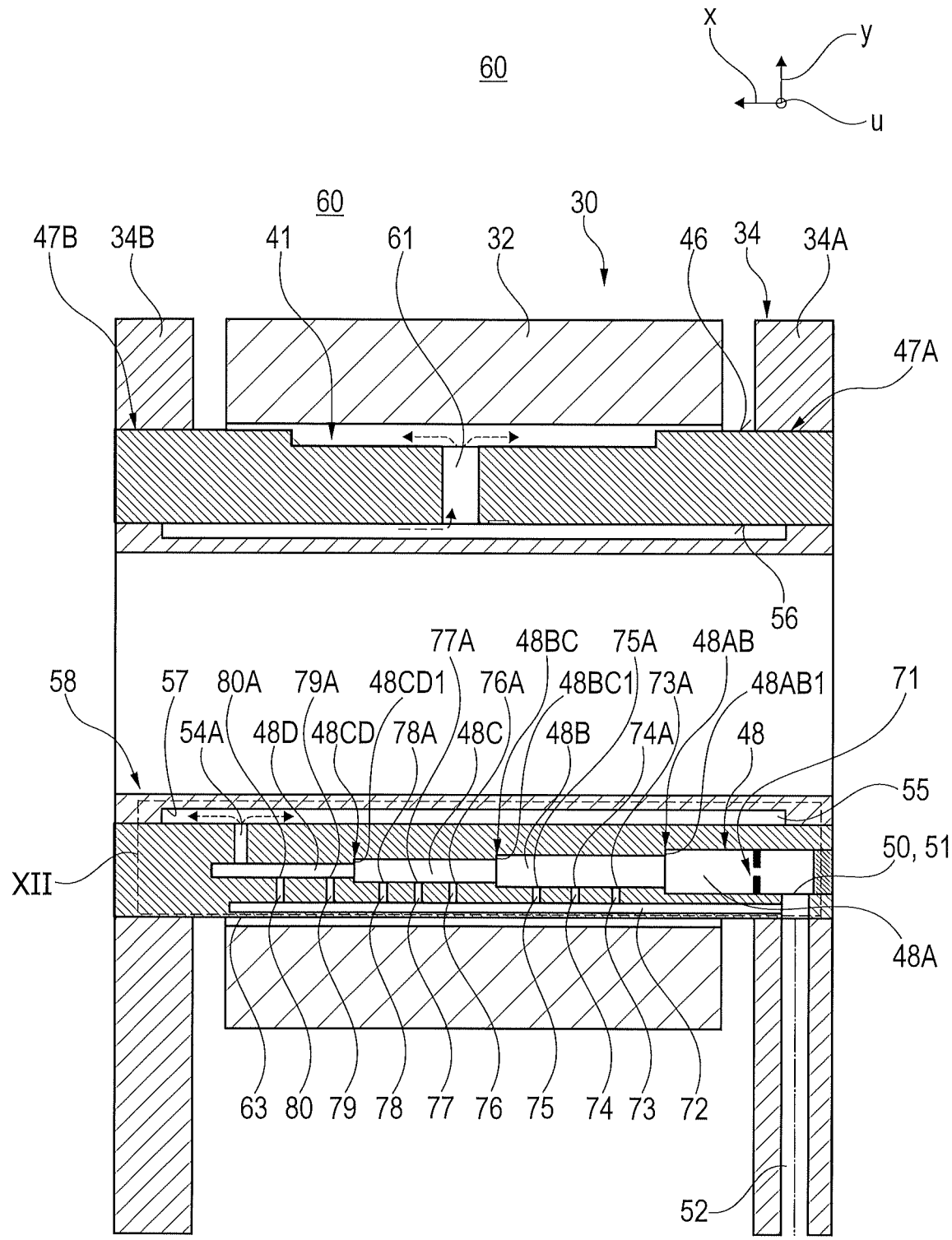
FIG. 9 shows an illustration corresponding to that of FIG. 6 of a further embodiment of the planetary gearbox according to FIG. 3.

FIG. 9 likewise shows an illustration corresponding to FIG. 6 of a further exemplary embodiment of the planetary gearbox 30, which likewise differs in design from the embodiment of the planetary gearbox 30 according to FIG. 6 only in partial regions. In the exemplary embodiment of the planetary gearbox 30 according to FIG. 9, an oil duct 71 which runs in the axial direction X and in the radial direction Y is disposed between the external side 46 of the planet pin 42 and the ducts 48 and 49, branches off from the oil feed line 52. Flow ducts 73 to 80 which open into the ducts 48 and 49 again branch off from the oil duct 72, wherein only those flow ducts 73 to 80 that open from the oil duct 72 into the duct 48 are shown in FIG. 9. Mouth regions 73A to 80A of the flow ducts 73 to 80 are again disposed in the internal side 70 of the duct 48. A desired supply of gearbox oil, proceeding from the oil feed line 52 to the oil duct 72, is adjusted by way of the aperture 71.

The flow ducts 73 to 80 between the oil duct 72 and the duct 48 in the planet pin 32 run in a substantially radially inward manner and with the axial direction X of the planet pin 42 enclose in each case an angle α of approximately 90°. Here, the flow ducts 73 to 75 open into the second duct portion 48B, the flow ducts 76 to 78 open into the third duct portion 48C, and the flow ducts 79 and 90 open into the fourth duct portion 48D.

FIG. 10 shows an enlarged view of a region X which comprises the duct 48 and is denoted more specifically in FIG. 6. Illustrated in FIG. 10 here is a flow profile GB of the gearbox oil in the duct 49, close to the internal side 70, said flow profile GB being established in the duct 48 by virtue of the stepped embodiment of the duct 48. The duct 48 in the transition regions 48AB, 48BC and 48CD has in each case step-shaped incident-flow profiles 48AB1 to 48CD1 that face the flow GB of the gearbox oil. The volumetric flow of gearbox oil GB in the region of the incident-flow profiles 48AB1 to 48CD1, in terms of the internal side 70 of the duct 48, is deflected radially inward in an almost perpendicular manner to the overflowed internal side 70 of the duct 48. When overflowing the transition regions 48AB, 48BC and 48CD, a turbulent flow is in each case generated in the volumetric flow of gearbox oil GB, as a result of which a recirculation zone 81 to 83 having at least one release bubble 84 to 86 is in each case configured in the volumetric flow of gearbox oil GB downstream of the incident-flow profiles 48AB1, 48BC1 and 48CD1, within the internal side 70 of the duct 48.

In the present case, the flow of the volumetric flow of gearbox oil is in each case deflected radially inward in terms of the internal side 70 of the duct 48 downstream of the incident-flow profiles 48AB1 to 48CD1. The release bubbles 84 to 86, and the recirculation zones 81 to 83, respectively, having in each case defined lengths L1 to L3. The defined lengths L1 to L3 of the recirculation zones 81 to 83, or of the release bubbles 84 to 86, are a function of heights H1 to H3 of the effective areas of the incident-flow profiles 48AB1 to 48CD1. The effective areas of the incident-flow profiles 48AB1 to 48CD1 correspond in each case to areas of the incident-flow profiles 48AB1 to 48CD1 that are projected in a plane perpendicular to the flow direction of the volumetric flow of gearbox oil GB. Reattachment regions 87 to 89 adjoin in each case the recirculation zones 81 to 83. The flow of the volumetric flow of gearbox oil GB is reattached to the internal side 70 of the duct 48 in the reattachment zones 87 to 89.

The heights H1 to H3 of the incident-flow profiles 48AB1, 48BC1 and 48CD1, and also the axial spacings between the incident-flow profiles 48AB1, 48BC1 and 48CD1 presently are of identical size. Depending on the respective specific application, there is however also the possibility that the heights of the incident-flow profiles 48AB1, 48BC1 and 48CD1, and also the axial spacings between the incident-flow profiles 48AB1, 48BC1 and 48CD1 deviate from one another in each case or are identical only in some case.

FIG. 11 shows an enlarged view of a region X1 denoted more specifically in FIG. 8. It can be seen from the illustration according to FIG. 11 that the mouths 66A to 68A of the flow ducts 66 to 68 are in each case disposed in regions of the internal side of the duct 48 in which the recirculation zones 81 and 82 are present, or in which the reattachment region 87 is configured, respectively.

A volumetric flow of gearbox oil is in each case guide in the direction of the mouths 66A to 68A by way of the flow ducts 66 to 68. The volumetric flows of gearbox oil in the flow ducts 66 to 68 of the exemplary embodiment discussed are in each case deflected by 90° or 30°, respectively, and directed into the turbulent boundary layers of the volumetric flow of gearbox oil GB in the duct 48. The gearbox oil flows directed from the flow ducts 66 to 68 into the duct 48 have the effect that further recirculation zones 90 to 92, having release bubbles 93 to 95, are in each case configured downstream of the mouths 66A to 68A. In this way, the respective thermal transfer coefficient in the region of the internal side 70 of the duct 48 is further improved.

Here, the defined angle α may have values between 30° and 140°.

FIG. 12 additionally shows an enlarged view of a region XII denoted more specifically in FIG. 9. It can be derived from the illustration according to FIG. 12, that the mouths 73A to 75A of the flow ducts 73 to 75 are in each case disposed in regions of the internal side of the duct 48 in the duct portion 48B, in which reattachment regions 96 to 98 of the gearbox oil flow GB are present or configured, respectively. Moreover, the mouths 76A to 78A of the flow ducts 76 to 78 are provided in reattachment regions 98 to 101 of the gearbox oil flow GB in the third duct portion 48C, and the mouths 79 and 80 are provided in reattachment regions 102 and 103 of the gearbox oil flow GB in the fourth duct portion 48D.

The volumetric flows of gearbox oil that exit in each case the mouths 73A to 80A cause a swirl in the gearbox oil flow GB downstream of the mouths 73A to 80A and downstream of the recirculation zones 81 to 83 generate in each case additional recirculation zones 104 to 111 in order to improve the thermal transfer.

LIST OF REFERENCE SIGNS

9 Main rotation axis
10 Gas turbine engine
11 Core
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
30 Gearbox, planetary gearbox 32 Planet gear
34 Planet carrier
34A, 34B Side plates
36 Linkage
38 Ring gear
40 Linkage
41 plain bearing
42 Planet pin
42A, 42B, 42C External diameter of the planet pin
43 Arrow, main load direction
44 Rotation direction of the planet gear
45 Radially outer point of the planet pin
46 External side of the planet pin
47A, 47B Bore of side plate 34A and 34B, respectively
48 Duct
48A First duct portion of the duct 48
48B Second duct portion of the duct 48
48C Third duct portion of the duct 48
48D Fourth duct portion of the duct 48
48AB Transition region between the first duct portion 48A and the second duct portion 48B
48BC Transition region between the second duct portion 48B and the third duct portion 48C
48CD Transition region between the third duct portion 48C and the fourth duct portion 48D
48AB1 Incident-flow profile of the transition region 48AB
48BC1 Incident-flow profile of the transition region 48BC
48CD1 Incident-flow profile of the transition region 48CD
49 Duct
49A First duct portion of duct 49
49B Second duct portion of the duct 49
49C Third duct portion of the duct 49
49D Fourth duct portion of the duct 49
49AB Transition region between the first duct portion 49A and the second duct portion 49B
49BC Transition region between the second duct portion 49B and the third duct portion 49C
49CD Transition region between the third duct portion 49C and the fourth duct portion 49D
49AB1 Incident-flow profile of the transition region 48AB
49BC1 Incident-flow profile of the transition region 48BC
49CD1 Incident-flow profile of the transition region 48CD
50, 51 Inlet of the ducts
52 Oil feed line
54A, 54B Bore
55 Annular space
55A Annular space portion
55B Annular space portion
56 Internal side of planet pin
57 External side of the inner sleeve
58 Inner sleeve
59 Bore
60 Environment
61 Further bore
62 Oil feed pocket
63 Bearing gap
64 Internal side of the planet gear
65 Separation ring
66 Flow duct
66A Mouth of the flow duct 66
67 Flow duct
67A Mouth of flow duct 67
68 Flow duct
68A Mouth of flow duct 68
70 Internal side of the duct 48
71 Aperture
72 Oil duct
73 to 80 Flow duct
73A to 80A Mouths of the flow ducts 73 to 80
81 to 83 Recirculation zone of the gearbox oil flow GB
84 to 86 Release bubble of the gearbox oil flow GB
87 to 89 Reattachment region of the gearbox oil flow GB
90 to 92 Further recirculation zone
93 to 95 Release bubble
96 to 103 Reattachment region
104 to 111 Additional recirculation zone
A Core air flow
B Air flow
FD Bearing force component
FF Bearing force component
GB Gearbox oil flow
H1 to H3 Height of the effective area of the incident-flow profile 48AB1 to 48CD1
L1 to L3 Length of the recirculation zone 81 to 83
phi Angle
U Circumferential direction
X Axial direction
Y Radial direction
α Angle

The invention claimed is:

1. A planetary gearbox for a gas turbine engine, comprising:
a planet carrier:
a planet gear, and a plain bearing rotatably mounting the planet gear on a planet pin that is connected in a rotationally fixed manner to the planet carrier,
at least one oil feed pocket positioned in a region of an external side of the planet pin, by way of which oil feed pocket oil is guided into a bearing gap between the external side of the planet pin and an internal side of the planet gear,
the planet pin, in a circumferential region of a main load direction of the plain bearing, having a duct positioned radially within the external side of the planet pin, the duct configured to carry gearbox oil having a cross section that is closed in relation to the bearing gap, and
the duct, in a flow direction of the gearbox oil in the duct, having sequential duct portions, wherein a flow cross section of the duct in a transition region between an upstream first duct portion and a next downstream second duct portion decreases in an at least approximately step-shaped manner,
the planet carrier being rotationally fixed, and
a main load direction of the plain bearing, conjointly with a radial direction of the planet carrier, in a rotation direction of the planet gear encloses an angle of approximately 90°,
the duct being arranged in a circumferential region of the plain bearing which conjointly with the radial direction of the planet carrier, in the rotation direction of the planet gear encloses angular values in a range from 60° to 135°, and
the at least one oil feed pocket being disposed outside a circumferential region of the plain bearing which, conjointly with the radial direction of the planet carrier, in the rotation direction of the planet gear encloses angular values in a range from 10° to 100°.

2. The planetary gearbox according to claim 1, wherein the duct in the axial direction of the planet pin, at least in a region of an end side of the planet pin is embodied to be open, and is connected to a discharge device by way of which the oil from the duct is guided in a direction of a tooth profile of the planet gear.

3. The planetary gearbox according to claim 1, wherein the planet carrier is embodied to be rotatable, and
   depending on an operating point, a main load direction of the plain bearing, conjointly with a radial direction of the planet carrier, in a rotation direction of the planet gear encloses angular values of from 110° to 180°,
   the duct being disposed in a circumferential region of the plain bearing which, conjointly with the radial direction of the planet carrier, in the rotation direction of the planet gear, encloses angular values in a range from 110° to 225°, and
   the at least one oil feed pocket being disposed outside a circumferential region of the plain bearing which, conjointly with the radial direction of the planet carrier, in the rotation direction of the planet gear encloses angular values in a range from 90° to 190°.

4. The planetary gearbox according to claim 1, wherein the duct extends radially inside an outer side of the planet pin in an axial direction and/or in a circumferential direction of the planet pin.

5. The planetary gearbox according to claim 1,
   wherein the duct in the transition region, in a region that faces a flow of the gearbox oil has a step-shaped incident-flow profile, and
   a volumetric flow of the gearbox oil in a region of the incident-flow profile in relation to an internal side of the duct is deflected radially inward, perpendicularly to an overflowed internal side of the duct,
   such that, downstream of the incident-flow profile and within an internal side of the duct disposed downstream of the first duct portion in the volumetric flow of gearbox oil, is configured a recirculation zone having at least one release bubble.

6. The planetary gearbox according to claim 5, wherein a spacing between two respective incident-flow profiles in a flow direction of the volumetric flow of gearbox oil is in a range between one times and ten times a height of an effective area of a front one of the two respective incident-flow profiles in the flow direction of the volumetric flow of gearbox oil.

7. The planetary gearbox according to claim 6, wherein the step-shaped incident-flow profiles extend approximately transversely to the flow direction of the volumetric flow of gearbox oil and in a circumferential direction of the first, second and third duct portions.

8. The planetary gearbox according to claim 5, wherein the step-shaped incident-flow profiles at least in regions have a convex and/or planar end face directed counter to the flow direction of the volumetric flow of gearbox oil, said end face enclosing an angle between 0° and 90° with the internal side of the duct.

9. The planetary gearbox according to claim 1, and further comprising at least one flow duct positioned in the planet pin, extending radially outward and having a mouth positioned in an internal side of the duct.

10. The planetary gearbox according to claim 9, wherein a volumetric flow of gearbox oil guided through the at least one flow duct exits the mouth at an angle (a) in relation to a flow direction of a volumetric flow of gearbox oil in the duct such that a recirculation zone is formed within the internal side of the duct downstream of the mouth.

11. The planetary gearbox according to claim 10, wherein the recirculation zone in the flow direction of the volumetric flow of gearbox oil has a defined length which is a function of a height of the effective areas of an incident-flow profile and corresponds to an area of the incident-flow profile which is projected in a plane that is perpendicular to the flow direction of the volumetric flow of gearbox oil.

12. The planetary gearbox according to claim 10, wherein the volumetric flow of gearbox oil in a region of an incident-flow profile and/or in a region of the mouth in comparison to the internal side of the duct is deflected to increase or so as to widen such that, in the flow direction of the volumetric gearbox oil flow, a respective reattachment region of the volumetric flow of gearbox oil adjoins the recirculation zone.

13. The planetary gearbox according to claim 12, wherein the mouth is at least approximately disposed in the region of the internal side of the duct in which the reattachment region is present.

14. The planetary gearbox according to claim 10,
   wherein the duct includes a third duct portion which in the flow direction of the gearbox oil adjoins the second duct portion, wherein the flow cross section of the duct in a transition region between the second duct portion and the third duct portion is reduced in an approximately step-shaped manner, and a further incident-flow profile is provided so that downstream of the further incident-flow profile, which in relation to the internal side of the duct downstream of the step-shaped incident-flow profile protrudes inward in terms of the internal side of the duct in an axial direction impacted by an incident flow of the volumetric flow of gearbox oil and deflects the volumetric flow of gearbox oil such that,
   downstream of the further incident-flow profile, within the internal side of the duct, a further recirculation zone is established, in which at least one release bubble is present.

15. The planetary gearbox according to claim 1, wherein a plurality of ducts are provided, said ducts being provided to run in an axial direction and/or in a circumferential direction of the planet pin.

16. The planetary gearbox according to claim 15, wherein the ducts are fluidically connected to one another.

17. The planetary gearbox according to claim 15, wherein at least one of the ducts downstream of a feed region of the gearbox oil into the ducts is fluidically connected to the at least one oil feed pocket.

18. The planetary gearbox according to claim 15, wherein a feed region by way of which oil is to be directed into the planet pin, by way of lines in the planet pin, is connected to the at least one of the ducts and to the at least one oil feed pocket, wherein the oil which by way of the feed region is directed into the planet pin, by way of the lines is to one part guided into the at least one of the ducts and to the other part into the at least one oil feed pocket.

19. The planetary gearbox according to claim 15, wherein each the duct has a diameter between 5 mm and 15 mm.

20. The planetary gearbox according to claim 15, wherein the ducts are operatively connected to a feed region such that the gearbox oil is guided in a co-current or countercurrent flow at least in two ducts extending adjacent to one another in the planet pin.

21. The planetary gearbox according to claim 20, wherein at least the two adjacent ducts through which the gearbox oil is guided in co-current flow are each operatively connected on an inlet side to the feed region.

22. The planetary gearbox according to claim 20, wherein in at least one of the two ducts, the gearbox oil is guided in a countercurrent flow, and the at least one of the two ducts is operatively connected on an inlet side to the feed region and connected on an outlet side to an inlet side of the adjacent duct.

23. The planetary gearbox according to claim 15, wherein a further component and the planet pin delimit a region which carries gearbox oil and which establishes a connection between an outlet of the duct or between at least one outlet of one of the ducts and the at least one oil feed pocket.

24. The planetary gearbox according to claim 23, wherein the region carrying gearbox oil is connected to the at least one oil feed pocket by a bore which runs radially in the planet pin.

25. A gas turbine engine for an aircraft, comprising the following:
- an engine core which comprises a turbine, a compressor, and a core shaft that connects the turbine to the compressor;
- a fan which is positioned upstream of the engine core, wherein the fan comprises multiple fan blades; and
- a gearbox, which receives an input from the core shaft and outputs drive for the fan to drive the fan at a lower rotating speed than the core shaft, wherein the gearbox is configured as the planetary gearbox according to claim 1.

26. A planetary gearbox for a gas turbine engine, comprising:
- a planet carrier:
- a planet gear, and a plain bearing rotatably mounting the planet gear on a planet pin that is connected in a rotationally fixed manner to the planet carrier,
- at least one oil feed pocket positioned in a region of an external side of the planet pin, by way of which oil feed pocket oil is guided into a bearing gap between the external side of the planet pin and an internal side of the planet gear,
- the planet pin, in a circumferential region of a main load direction of the plain bearing, having a duct positioned radially within the external side of the planet pin, the duct configured to carry gearbox oil having a cross section that is closed in relation to the bearing gap, and
- the duct, in a flow direction of the gearbox oil in the duct, having sequential duct portions, wherein a flow cross section of the duct in a transition region between an upstream first duct portion and a next downstream second duct portion decreases in an approximately step-shaped manner,
- the planet carrier being rotatable, and
    - depending on an operating point, a main load direction of the plain bearing, conjointly with a radial direction of the planet carrier, in a rotation direction of the planet gear encloses angular values of from 110° to 180°,
- the duct being disposed in a circumferential region of the plain bearing which, conjointly with the radial direction of the planet carrier, in the rotation direction of the planet gear, encloses angular values in a range from 110° to 225°, and
- the at least one oil feed pocket being disposed outside a circumferential region of the plain bearing which, conjointly with the radial direction of the planet carrier, in the rotation direction of the planet gear encloses angular values in a range from 90° to 190°.

27. A planetary gearbox for a gas turbine engine, comprising:
- a planet carrier:
- a planet gear, and a plain bearing rotatably mounting the planet gear on a planet pin that is connected in a rotationally fixed manner to the planet carrier,
- at least one oil feed pocket positioned in a region of an external side of the planet pin, by way of which oil feed pocket oil is guided into a bearing gap between the external side of the planet pin and an internal side of the planet gear,
- the planet pin, in a circumferential region of a main load direction of the plain bearing, having a duct positioned radially within the external side of the planet pin, the duct configured to carry gearbox oil having a cross section that is closed in relation to the bearing gap, and
- the duct, in a flow direction of the gearbox oil in the duct, having sequential duct portions, wherein a flow cross section of the duct in a transition region between an upstream first duct portion and a next downstream second duct portion decreases in an approximately step-shaped manner,
- wherein the duct in the transition region, in a region that faces a flow of the gearbox oil has a step-shaped incident-flow profile, and
- a volumetric flow of the gearbox oil in a region of the incident-flow profile in relation to an internal side of the duct is deflected radially inward, perpendicularly to an overflowed internal side of the duct,
- such that, downstream of the incident-flow profile and within an internal side of the duct disposed downstream of the first duct portion in the volumetric flow of gearbox oil, is configured a recirculation zone having at least one release bubble.

* * * * *